United States Patent
Bowen, Jr. et al.

(10) Patent No.: US 8,004,970 B2
(45) Date of Patent: Aug. 23, 2011

(54) METHOD, SYSTEM AND PROGRAM PRODUCT FOR SETTING A TRANSMISSION RATE IN A NETWORK

(75) Inventors: Hoyt E. Bowen, Jr., Chapel Hill, NC (US); Mircea Gusat, Adliswil (CH); Clark D. Jeffries, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 1137 days.

(21) Appl. No.: 11/215,610

(22) Filed: Aug. 30, 2005

(65) Prior Publication Data

US 2007/0058651 A1 Mar. 15, 2007

(51) Int. Cl.
*H04L 1/00* (2006.01)
*H04L 12/26* (2006.01)
*H04J 3/14* (2006.01)

(52) U.S. Cl. ............... 370/229; 370/230; 370/230.1; 370/231; 370/232

(58) Field of Classification Search .............. 370/229, 370/230, 230.1, 231, 232, 233, 234, 235, 370/235.1, 236, 236.2, 237, 238
See application file for complete search history.

(56) References Cited

U.S. PATENT DOCUMENTS

| | | | |
|---|---|---|---|
| 5,787,071 A * | 7/1998 | Basso et al. | 370/231 |
| 5,838,922 A | 11/1998 | Galand et al. | |
| 5,859,837 A | 1/1999 | Crayford | |
| 5,898,671 A * | 4/1999 | Hunt et al. | 370/235 |
| 6,201,789 B1 | 3/2001 | Witkowski et al. | |
| 6,408,005 B1 | 6/2002 | Fan et al. | |
| 6,498,782 B1 * | 12/2002 | Branstad et al. | 370/231 |
| 6,654,811 B1 | 11/2003 | Chasker et al. | |
| 6,721,310 B2 | 4/2004 | Liu et al. | |
| 6,721,797 B1 | 4/2004 | Kim | |
| 2004/0120252 A1 * | 6/2004 | Bowen et al. | 370/229 |

* cited by examiner

*Primary Examiner* — Kwang B Yao
*Assistant Examiner* — Adam Duda
(74) *Attorney, Agent, or Firm* — Arthur J. Samodovitz

(57) ABSTRACT

The present invention provides for congestion and flow control for a data transmission between computers in a network (e.g., a lossless network) by repeatedly setting a transmission rate for the data transmission at predetermined time intervals. Under the present invention, a ratio of a current occupancy to a maximum occupancy of a queue used for the data transmission is provided (e.g., the ratio can be calculated under the present invention, or obtained as input from an external source). The queue can be that of the receiving computer or of any component (e.g., a switch) that resides in the path of the data transmission. In any event, once the ratio is known, the present invention will set the transmission rate for the data transmission based on a comparison of the ratio to at least one threshold.

3 Claims, 10 Drawing Sheets

METHOD, SYSTEM AND PROGRAM PRODUCT FOR SETTING A TRANSMISSION RATE IN A NETWORK

BACKGROUND OF THE INVENTION

1. Field of the Invention

The present invention relates generally to bandwidth allocation. Specifically, the present invention provides a method, system and program product for setting a transmission rate in a network (e.g., lossless network).

2. Related Art

As computer networks continue to grow in sophistication and use, congestion is becoming an ever increasing problem. In general, networks can be classified into two different types: (1) lossless; and (2) non-lossless. An example of a non-lossless network is the Internet. In such a network, congestion control is typically implemented by dropping packets from data transmissions between computers (endpoints). For example, if a buffer or queue for a receiving computer reaches its capacity, the resulting congestion is relieved by dropping packets from the transmission.

While this solution may work for a non-lossless network, it is unsatisfactory for a lossless network. Examples of lossless networks (e.g., Infiniband) include clusters of computer nodes, computer grids, networks that connect to storage centers, etc. In such networks, the dropping of packets is not an option since the resulting data loss can seriously undermine the intended purpose(s) of the communication. This is especially the case with communications to and from a storage grid in which a dropped packet could mean lost data. A typical scenario in which congestion becomes a problem in a lossless network is when a receiving computer (e.g., a receiving node) is receiving data transmissions from two different sending computers (e.g., sending nodes). Specifically, if both sending computers are transmitting at 100% capacity, the receiving computer will essentially be forced to process at 200% capacity. The result is congestion and bottlenecking in which data packet dropping can not be utilized for relief.

SUMMARY OF THE INVENTION

In general, the present invention provides a method, system and program product for setting a transmission rate in a network. Specifically, the present invention provides for congestion and flow control for a data transmission between computers in a lossless network by repeatedly setting a transmission rate for the data transmission at predetermined time intervals. Under the present invention, a ratio of a current occupancy to a maximum occupancy of a queue used for the data transmission is provided (e.g., the ratio can be calculated under the present invention, or obtained as input from an external source). The queue can be that of the receiving computer or of any component (e.g., a switch) that resides in the path of the data transmission. In any event, once the ratio is known, the present invention will set the transmission rate for the data transmission based on a comparison of the ratio to at least one threshold.

In a typical embodiment, the transmission rate will be set: (1) to a first value if the ratio is less than a first threshold (e.g., 1/4); (2) to a second value if the ratio is greater than a second threshold (e.g., 3/4); (3) to the first value if the ratio is equal to or greater than the first threshold and equal to or less than the second threshold, and a previous occupancy of the queue is greater than a current occupancy of the queue; or (4) to a third value if the ratio is equal to or greater than the first threshold and equal to or less than the second threshold, and the current occupancy of the queue is equal to or greater than the previous occupancy of the queue.

In the typical embodiment, the first value can be a minimum of two possible values, which include: a value of one, and a value computed by summing a current transmission rate for the data transmission with a first fraction (e.g., 1/256) of a predetermined time interval. The second value is the product of a current transmission rate for the data transmission, and a second fraction (e.g., 1/2) of the predetermined time interval subtracted from a value of one. The third value is a product of the current transmission rate for the data transmission, and a third fraction (e.g., 1/16) of the predetermined time interval subtracted from the value of one.

The process of setting the transmission rate of the present invention will be repeated at a predetermined time interval, which is typically less than the amount of time it would take for the data transmission to fill the queue so that queue overflow does not occur. Still further, it should be understood that the present invention could be implemented as a business method. For example, an application and/or computer infrastructure that performs the functions of the present invention could be implemented, deployed, supported, etc., by a service provider on behalf of customers. In addition, the present invention could be implemented as computer software embodied in a propagated signal in which the computer software includes instructions that cause a computer to perform the functions cited herein.

BRIEF DESCRIPTION OF THE DRAWING

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements among the drawings.

DETAILED DESCRIPTION OF THE INVENTION

For convenience purposes, the Detailed Description of the Invention will have the following sections:
I. General Description
II. Implementation
III. Illustrative Example I. General Description As indicated above, the present invention provides for congestion and flow control for a data transmission between computers in a network (e.g., a lossless network) by repeatedly setting a transmission rate for the data transmission at predetermined time intervals. Under the present invention, a ratio of a current occupancy to a maximum occupancy of a queue used for the data transmission is provided (e.g., the ratio can be calculated under the present invention, or obtained as input from an external source). The queue can be that of the receiving computer or of any component (e.g., a switch) that resides in the path of the data transmission. In any event, once the ratio is known, the present invention will set the transmission rate for the data transmission based on a comparison of the ratio to at least one threshold.

Figure 1:
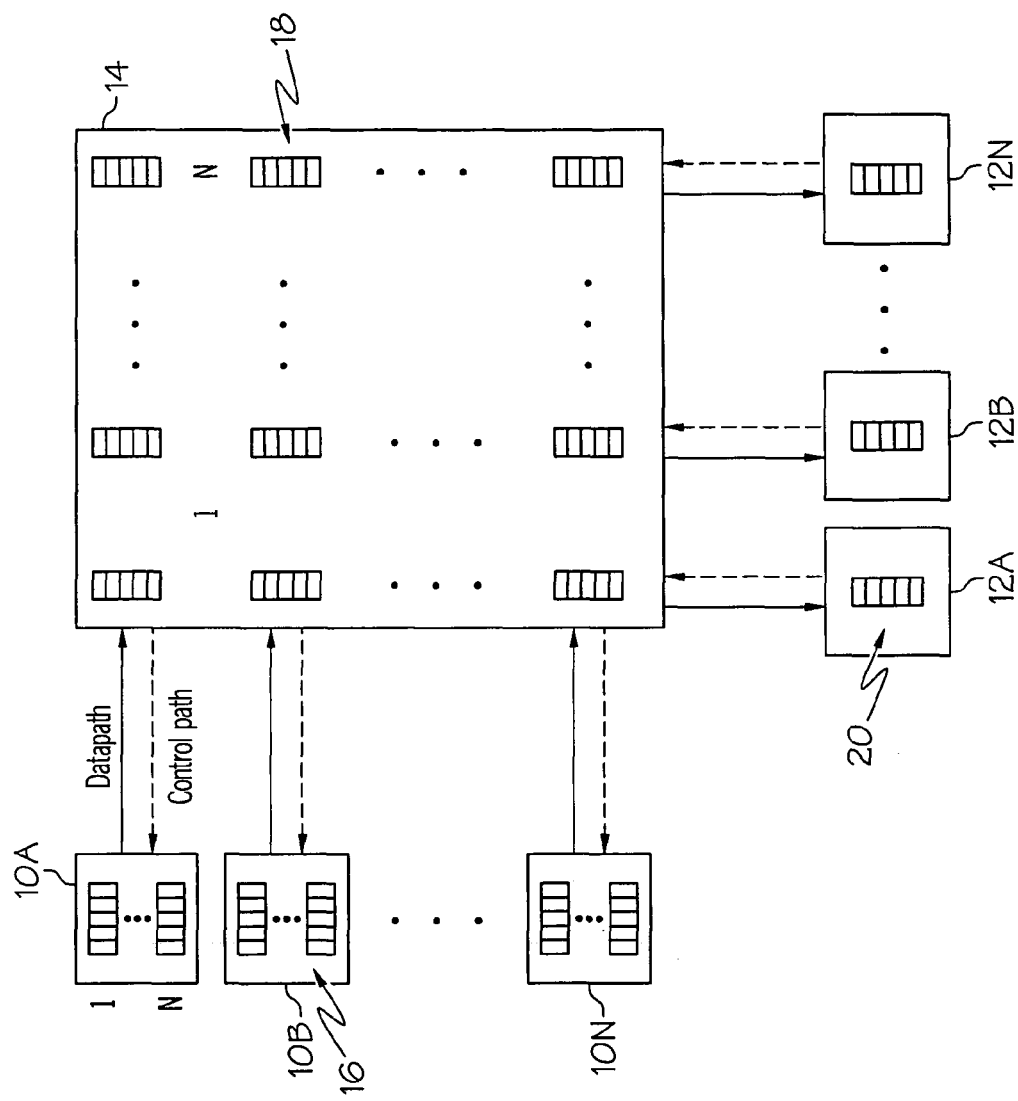
FIG. 1 shows data transmissions between computers according to the present invention.

Referring now to FIG. 1 a diagram depicting communication flows between computers according to the present invention is shown. Specifically, FIG. 1 shows data transmissions (data path) from sending computers 10A-N to receiving computers 12A-N, as well as control information (control path) transmitted from receiving computers 12A-N to sending computers 10A-N. The data transmissions and control information are shown as being communicated through a switch element 14. This is to demonstrate that communications between sending computers 10A-N and receiving computers 12A-N can be indirect by flowing through one or more other components.

It should be understood that computers 10A-N are referred to herein as sending computers and computers 12A-N as receiving computers with respect to the directional flow of the data transmission shown in FIG. 1 for illustrative purposes only. To this extent, it should be understood these roles could be reversed for data transmission occurring from computers 12A-N to computers 10A-N. It should also be understood that sending computers 10A-N, receiving computers 12A-N and switch element 14 are interconnected over a network. In a typical embodiment of the present invention, the network is a lossless network in which data packet dropping due to congestion cannot be permitted to occur. Specifically, FIG. 1 also depicts various queues (or queue groups) 16, 18 and 20. These queues 16, 18 and 20 are used to store packets of a data transmission as they are being communicated from an origin to a destination. For example, assume that data transmission "A" is occurring from sending computer 10A to receiving computer 12A. As this is occurring, data packets for data transmission "A" will be stored in a certain queue 18 of switch element 14 and then in a certain queue 20 of receiving computer 12A. If the data transmission is occurring at a rate higher than the rate at which the queues 18 and 20 can be relieved, bottlenecking or congestion will occur. This problem is compounded if another sending computer begins to transmit to the same receiving computer 12A. For example, further assume that as data transmission "A" is occurring, sending computer 10B begins to send data transmission "B" to receiving computer 12A. This will increase the amount of occupancy of queues 18 and 20, and thus, increase the chances of congestion and bottlenecking.

The present invention relieves congestion and bottlenecking by providing congestion and flow control for data transmissions. Specifically, under the present invention, the transmission rate (also known as a throttle rate or value) of a data transmission is repeatedly set at predetermined time intervals so that queue occupancy is maintained at optimal levels. As will be further disclosed below, the present invention provides the capability to not only reduce the speed of a data transmission to avoid overfilling a queue, but it can also increase the speed of a data transmission to avoid under using a queue. To this extent, control transmissions (control paths) shown occurring from receiving computers 12A-N to sending computers 10A-N will typically include data corresponding to the occupancy of queues 18 and 20.

I. Implementation

Figure 2:
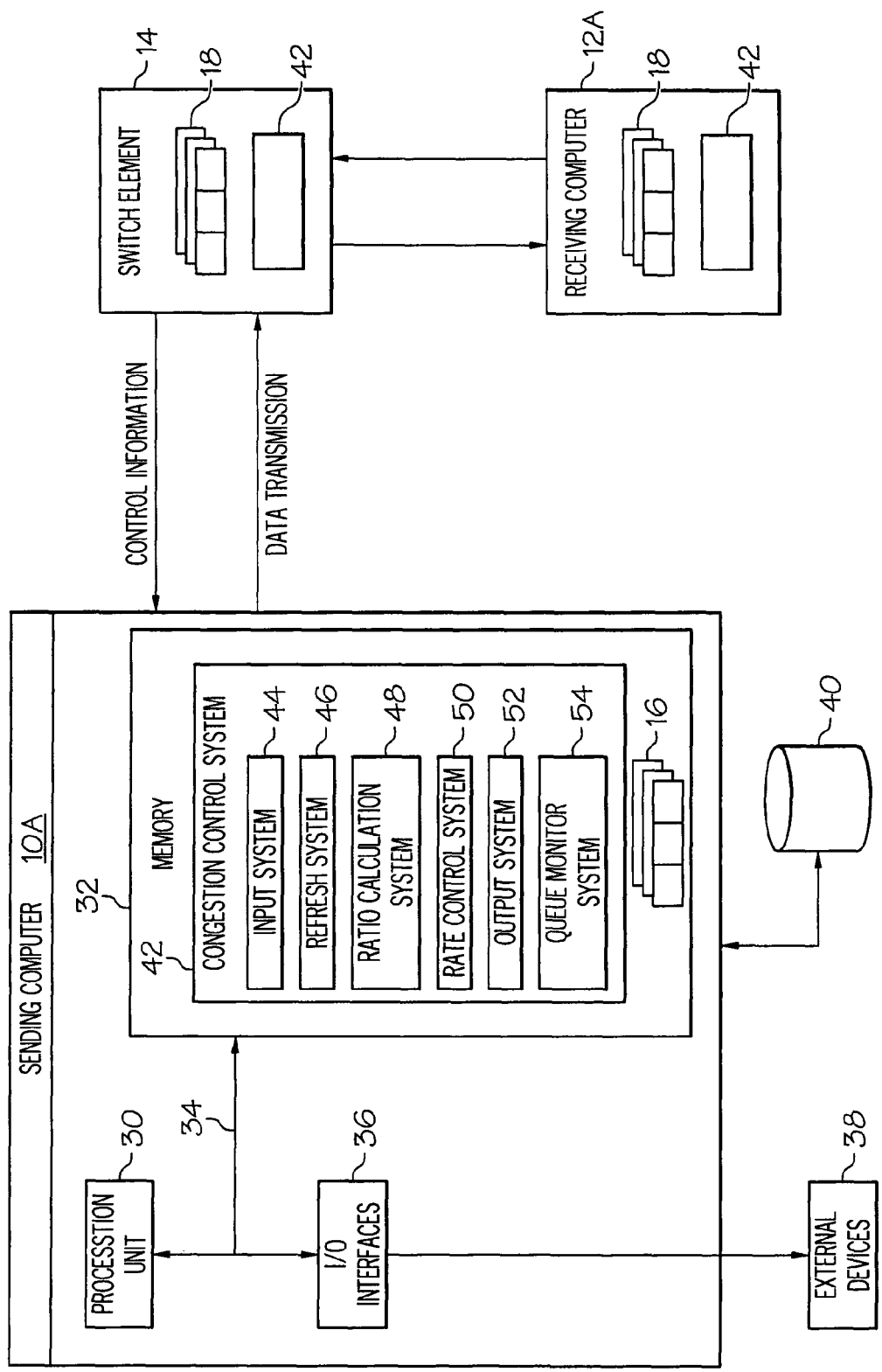
FIG. 2 shows a rate control system for setting transmission rates for data transmissions according to the present invention.

Referring now to FIG. 2, a more detailed depiction of the present invention is shown. As shown, FIG. 2 depicts sending computer 10A, switch element 14 and receiving computer 12A. It should be noted that the other computers of FIG. 1 have not been shown in FIG. 2 for brevity purposes only. It should also be understood that one or more of computers 10A-N, 12A-N (FIG. 1) and/or switch element 14 could be provided within a computer infrastructure that is deployed, managed, serviced, etc., by a service provider who offers to perform the functions of the present invention for customers.

In any event, sending computer 10A is shown including a processing unit 30, a memory 32, a bus 34, and input/output (I/O) interfaces 36. Further, sending computer 10A is shown in communication with external I/O devices/resources 38 and storage system 40. In general, processing unit 30 executes computer program code, such as congestion control system 42, which is stored in memory 32 (as shown) and/or storage system 40. While executing computer program code, processing unit 30 can read and/or write data, to/from memory 32, storage system 40, and/or I/O interfaces 36. Bus 34 provides a communication link between each of the components in sending computer 10A. External devices 38 can comprise any devices (e.g., keyboard, pointing device, display, etc.) that enable a user to interact with sending computer 10A and/or any devices (e.g., network card, modem, etc.) that enable sending computer 10A to communicate with one or more other computing devices.

Sending computer 10A is only representative of various possible computer systems that can include numerous combinations of hardware and/or software. To this extent, in other embodiments, sending computer 10A can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 30 may comprise a single processing unit, or be distributed across one or more processing units in one or more locations, e.g., on a client and server.

Similarly, memory 32 can comprise any combination of various types of data storage and/or transmission media that reside at one or more physical locations. Further, I/O interfaces 36 can comprise any system for exchanging information with one or more external devices 38. Still further, it is understood that one or more additional components (e.g., system software, math co-processing unit, etc.) not shown in FIG. 2 can be included in sending computer 10A. However, if sending computer 10A comprises a handheld device or the like, it is understood that one or more external devices 38 (e.g., a display) could be contained within sending computer 10A, not externally as shown.

As shown, sending computer 10A communicates with storage system 40, which can be any type of system (e.g., a database) capable of providing storage for information under the present invention such as rate control algorithms, control data, refresh rates, and/or thresholds, etc. To this extent, storage system 40 could include one or more storage devices, such as a magnetic disk drive or an optical disk drive. In another embodiment, storage system 40 could include data distributed across, for example, a local area network (LAN), wide area network (WAN) or a storage area network (SAN) (not shown). In addition, although not shown, additional components, such as cache memory, communication systems, system software, etc., may be incorporated into sending computer 10A. Moreover, although note shown for brevity purposes, switch element 14 and/or receiving computer 12A will likely include or communicate with computer components similar to sending computer 10A.

Shown in memory 32 of sending computer 10A is congestion control system 42, which includes input system 44, refresh system 46, (optional) ratio calculation system 48, rate control system 50, output system 52 and queue monitor system 54. It should be appreciated that congestion control system 42 is typically provided on sending computers as well as receiving computers and switch elements so that the teachings recited herein and be practiced in a multi-directional manner. In any event, assume in an illustrative embodiment, that sending computer 10A is sending a data transmission of data packets to receiving computer 12A through switch element 14. As this is occurring, queue monitor systems 54 in receiving computer 12A and switch element 14 (not explicitly depicted in FIG. 2), will monitor the receiving queues 18 and 20 and provide feedback in the form of control information, which will be received by input system 44 of sending computer 10A. Congestion control system 42 will use the control information to set the transmission rate for the data transmission so that queues 18 and 20 do not become over or under-utilized.

As will be further explained below, the transmission rate Ti will be repeatedly set according to a predetermined time interval Dt (e.g., a refresh rate) based on control information (e.g., feedback) received from receiving computer 12A and/or switch element 14. Under the present invention, Dt should be set to a value that is smaller (<) than the saturation interval of the receiving queue(s) (i.e., the interval over which a queue(s) receiving at the maximum possible rate and transmitting at zero rate would go from completely empty to completely occupied/full). In other words, the transmission rate Ti should be updated faster than the receiving queue(s) should fill up. For example, assume that the total transmission rate Ti from all sources is ten packets/millisecond. Further assume that the maximum capacity of the receiving queue "A" is 20 packets. In this case, queue "A" will become filled/saturated in two milliseconds. As such, under the present invention, the transmission rate Ti should be refreshed at a predetermined time interval Dt that is less than two milliseconds. In a preferred embodiment, Dt is ⅛ of the saturation time, which for a two millisecond saturation time yields a Dt of is 0.25 milliseconds. In another embodiment, Dt is determined according to the following algorithm:

$$Dt = Qmax/(aggreg\_lambda * RTT\_link * K)$$

Qmax=the maximum queue occupancy;
aggreg_lambda=the maximum arrival rate from all sources;
RTT_link=the per hop causal delay between sender and receiver; and
K=an over-sampling factor (8×).

In any event, as the data transmission is occurring from sending computer 10A to receiving computer 12A, refresh system 46 will keep track of Dt (and can even re-compute Dt as changes are needed). In one embodiment, every Dt time units, ratio calculation system 48 will use the control information to automatically determine a ratio of a current occupancy of the receiving queue(s) $Qi(t)$ to a maximum occupancy of the receiving queue(s) Qmax. For example, if the maximum occupancy of the receiving queue(s) is ten data packets, and the receiving queue(s) currently has four packets, the receiving queue(s) is 40% full or consumed. In another embodiment, the control information could include the ratio so that sending computer 10A need not make the calculation. To this extent, the term "providing" or "provide" is intended accommodate both scenarios.

The ratio will be used by rate control system 50 to set a transmission rate for the data transmission that optimizes the occupancy of the receiving queue(s). Specifically, rate control system 50 will set a transmission rate for the data transmission based on a comparison of the ratio to at least one threshold. In a typical embodiment of the present invention, rate control system 50 will use the following Bandwidth Allocation Technology (BAT) algorithm to set the transmission rate:

$$Ti(t+Dt) = \text{if } Qi(t) < \frac{1}{4}, \text{ then } \min\{1, Ti(t)+(\frac{1}{256})\}$$

$$\text{elseif } Qi(t)/Qmax > \frac{3}{4}, \text{ then } Ti(t)*(1-(\frac{1}{2})*Dt)$$

$$\text{elseif } Qi(t-Dt) > Qi(t), \text{ then } \min\{1, Ti(t)+(\frac{1}{256})*Dt\}$$

$$\text{else } Ti(t)*(1-(\frac{1}{16})*Dt)$$

$Ti(t+Dt)$=the transmission rate being determined;
$Qi(t)$=the current queue occupancy;
Qmax=the maximum queue occupancy;
$Ti(t)$=the current transmission rate; and
$Qi(t-Dt)$=the previous queue occupancy; and where the parameters T, D and Q are Normalized to be unit-less.

As can be seen, the BAT algorithm provides four conditions for setting the transmission rate $Ti(t+Dt)$. From the first line, it can be seen that rate control system 50 will set the transmission rate (t+Dt) will be set to a first value if the ratio is less than 1/4 (i.e., the receiving queue is less than 25% full). This generally means that the transmission rate can be increased so that more of the receiving queue(s) is used. As shown, the first value is a minimum of two possible values. These two possible values include (1) a value of one; and (2) a value computed by summing the current transmission rate Ti for the data transmission with 1/256 of the predetermined time interval Dt.

From the second line of the BAT algorithm, it can be seen that if the ratio is greater than 3/4 (i.e., the receiving queue is more than 75% full), the transmission rate $Ti(t+Dt)$ will be set by rate control system 50 to a second value, which will result in slowing the data transmission down so that the receiving queue(s) does not overflow or become completely occupied. As shown, the second value is a product of the current transmission rate Ti, and one half of the predetermined time interval subtracted from the value one.

From the third line of the BAT algorithm, it can be seen that rate control system 50 will set the transmission rate $Ti(t+Dt)$ to the first value (shown above for line one of the BAT algorithm) if the ratio is equal to or greater than 1/4 and equal to or less than 3/4, and a previous occupancy $Qi(t-Dt)$ of the receiving queue(s) is greater than the current occupancy $Qi(t)$ of the receiving queue(s). Generally, this condition occurs when the receiving queue is anywhere from 25% to 75% occupied, and is occupied less than it was during the previous time interval. In this case, the occupancy of the receiving queue(s) has gone down from the previous time interval. As such, the occupancy of the receiving queue(s) can be increased to optimize its usage.

From the fourth line of the BAT algorithm, it can be seen that rate control system 50 will set the transmission rate to a third value if the ratio is equal to or greater than 25% and equal to or less than the 75%, and the current occupancy of the queue is equal to or greater than a previous occupancy of the queue. This condition is typically referred to as normal operation and occurs when an occupancy of the receiving queue(s) is equal to or more than it was at a previous time interval, but is from 25% to 75% and thus not being under or over used. As shown, the third value is a product of the current transmission rate Ti, and 1/16 of the predetermined time interval subtracted from the value of one.

It should be understood that certain thresholds for the ratio (e.g., 1/4 and 3/4) as well as certain fractions of the predetermined time interval (e.g., 1/256, 1/2, 1/16) have been shown in the BAT algorithm for illustrative and/or best mode purposes only. As such, these values could be varied within the scope of the present invention. In any event, as the transmission rate Ti(t+Dt) is being set and reset as cited above, output system 52 can use the control information being fed back to provide charts graphs and other output for examination. Examples of such output will be further shown and discussed in conjunction with the illustrative example of section III.

Regardless, assume that measurement units are chosen so that Dt and Qmax are set to values of 1. With such units, the BAT algorithm would appear as follows:

$$Ti(t+Dt) = \text{if } Qi(t) < 1/4, \text{ then } \min\{1, Ti(t)+(1/256)\}$$

$$\text{else if } Qi(t) > 3/4, \text{ then } Ti(t)*(1/2))$$

$$\text{else if } Qi(t-Dt) > Qi(t), \text{ then } \min\{1, Ti(t)+(1/256)\}$$

$$\text{else } Ti(t)*(15/16)$$

Such an algorithm includes the principle of linearly increasing Ti in the absence of congestion and exponentially decreasing Ti in the presence of congestion. In an alternative embodiment, the coefficients of linear increase can differ from 1/256 and the coefficients of exponential decrease can differ from 1/2 and 15/16.

As mentioned above, the setting of the transmission rate Ti(t+Dt) is repeated every Dt time intervals, as monitored by refresh system 46. As such, every Dt time units, ratio calculation system 48 (if utilized) can re-compute the ratio based on control information received in input system 44, and rate control system 50 can set the (new) transmission rate Ti(T+Dt) based thereon using the BAT algorithm.

It should be understood that Dt can be subject to change should the rate of occupancy of receiving queue(s) change. For example, if another sending computer, such as computer 10B (FIG. 1) began a data transmission to receiving computer 12A, and that data transmission is received in the same queue (s) 18 and/or 20, the rate of saturation of the receiving queue (s) will increase (i.e., the saturation interval will decrease). For example, if the receiving queue(s) previously had a saturation time of two milliseconds when only sending computer 10A was transmitting thereto, and now the receiving queue(s) have a saturation time of one millisecond due to the new data transmission, the Dt should be halved. Under the present invention, Dt can be manually determined and fed to input system 44 (e.g., by an administrator), or it can be automatically computed (e.g., as 1/8 of the saturation time or some other algorithm) by refresh system 46. In the case of the latter, refresh system 46 would use values such as Qmax as received in control information, as well as the current transmission rates Ti and size (quantity of packets) of the data transmissions known to be flowing to the receiving queue(s). To this extent, the control information sent to sending computer(s) 10A-B could not only include queue information (e.g., current occupancy, previous occupancy, maximum occupancy), but also data transmission information (packet quantity, transmission rate, etc.) for all data transmissions being receiving by the receiving queue(s). In addition, as mentioned above, queue monitor system 54 is provided to monitor queues 16 and provide control information during incoming data transmissions. This illustrates that sending computer 10A could also function as a receiving computer (e.g., computer 12A).

Figure 3:
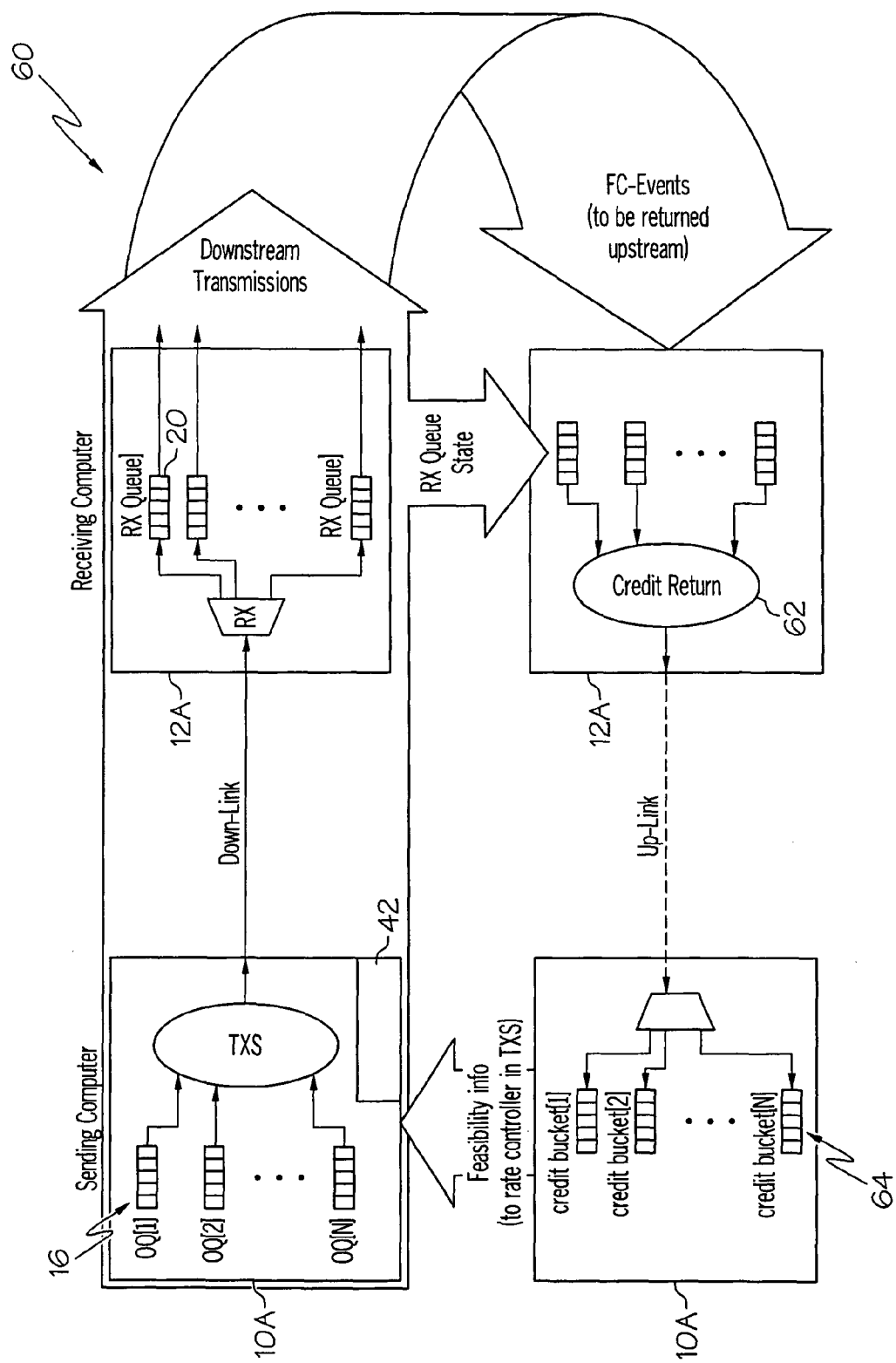
FIG. 3 shows an illustrative hardware embodiment according to the present invention.

Referring to FIG. 3, a first illustrative hardware implementation 60 according to the present invention is shown. As depicted, data transmission is flowing from sending computer 10A to queues 20 of receiving computer 12A. In this embodiment, receiving computer 12A utilizes a credit return unit/ system 62 to return control information to sending computer 10A. Specifically, credit return unit 62 issues credits for the data transmission (e.g., credits could correspond to data packets and/or other information). The credits are received in credit buckets 64 of sending computer 10A as the control information. This information is used by congestion control system 42 to set and reset the transmission rates of the data transmission as shown and described above.

Figure 4:
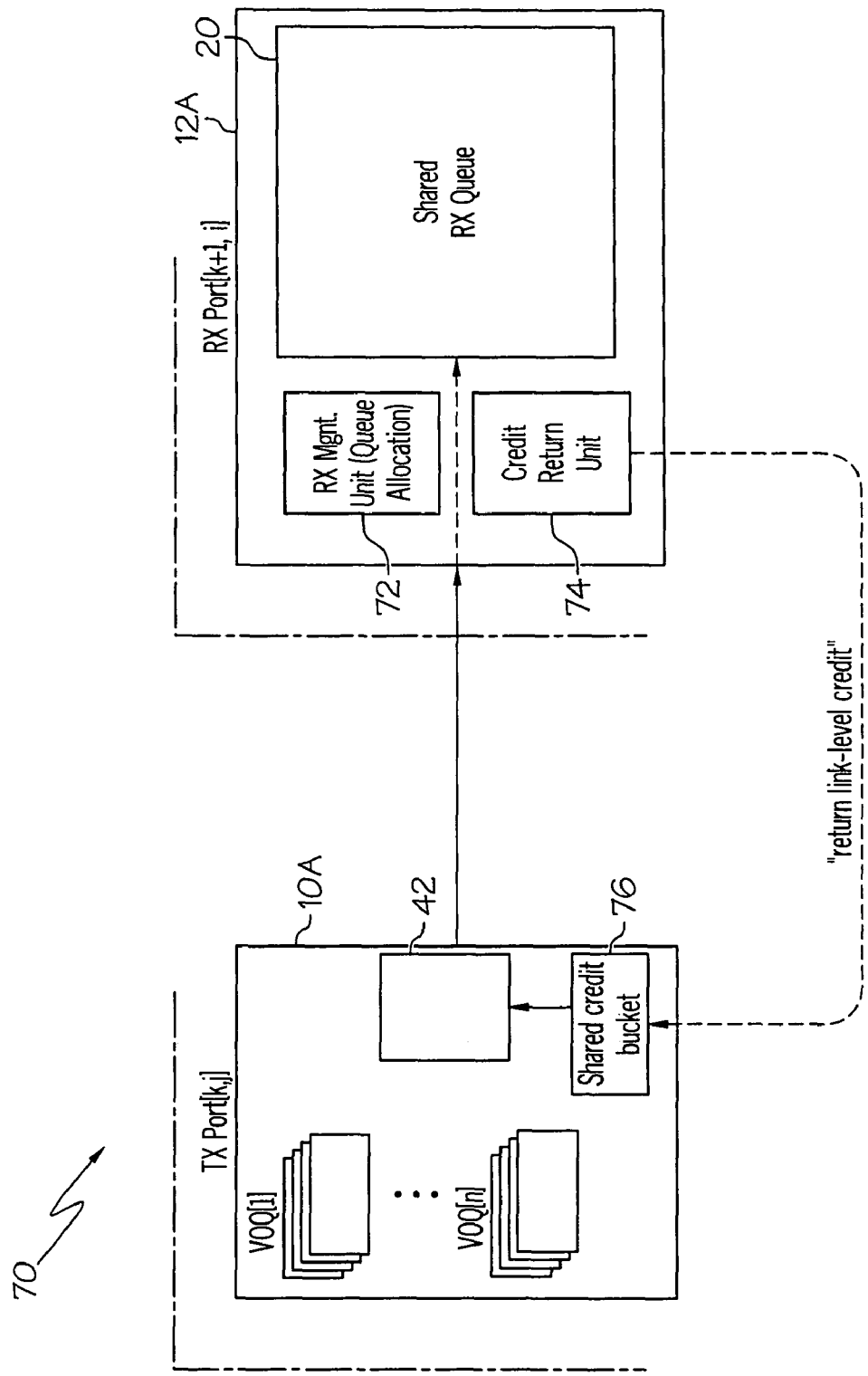
FIG. 4 shows another illustrative hardware embodiment according to the present invention.

Referring now to FIG. 4, a second illustrative hardware implementation 70 according to the present invention is shown. In this embodiment 70, receiving computer 12A is shown having a single shared queue 20, as opposed to multiple different queues as shown in FIG. 3. To this extent, receiving computer 12A also includes memory management unit 72 to manage the shared queue 20, as well as credit return unit/system 74 to return credits to sending computer 10A. Similar to receiving computer 12A, sending computer 10A has shared (as opposed to separate) resources. For example, instead of multiple credit buckets as shown in FIG. 3, sending computer 10A includes a shared credit bucket 76 that receives credits from receiving computer 12A. These credits contain the control information that is used by congestion control system 42 to set and reset the transmission rates of the data transmission as shown and described above.

Figure 5:
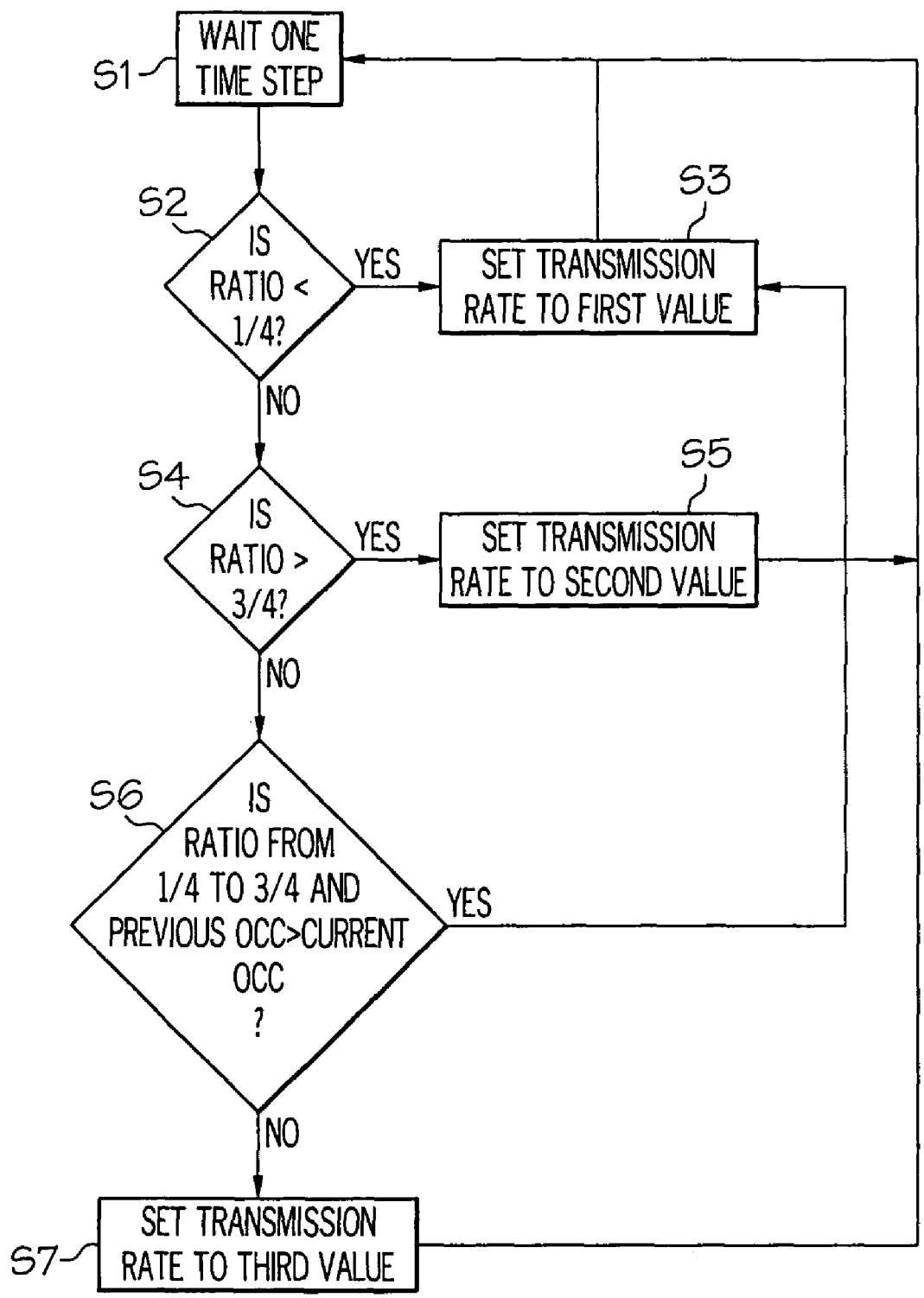
FIG. 5 shows a method flow diagram according to the present invention.

Referring now to FIG. 5, an illustrative method flow diagram according to the BAT algorithm of the present invention is shown. As depicted, first step S1 is to wait one time step or refresh rate Dt, after which second step S2 is to determine whether the ratio of current queue occupancy to maximum queue occupancy is less than 1/4. If so, the transmission rate is set to a first value in step S3 that increases the rate of flow. If the ratio is not less than 1/4, then it is determined in step S4 whether the ratio is greater than 3/4. If so, then the transmission rate is set to a second value in step S5 that reduces the rate of flow. If however, the ratio is determined to be from 1/4 to 3/4 and the occupancy of the queue during the previous time step (i.e., the previous occupancy) is greater than it is during the current time step (i.e., the current occupancy) in step S6, then the transmission rate is set to the first value in step S3. As indicated above, the first value will result in an increase in the rate of flow of the data transmission. Finally, if the ratio is determined to be from 1/4 to 3/4 but the previous occupancy of the queue is not greater than the current occupancy of the queue, then the transmission rate is set to a third value in step S7, which represents normal operation.

III. Illustrative Example

Figure 6:
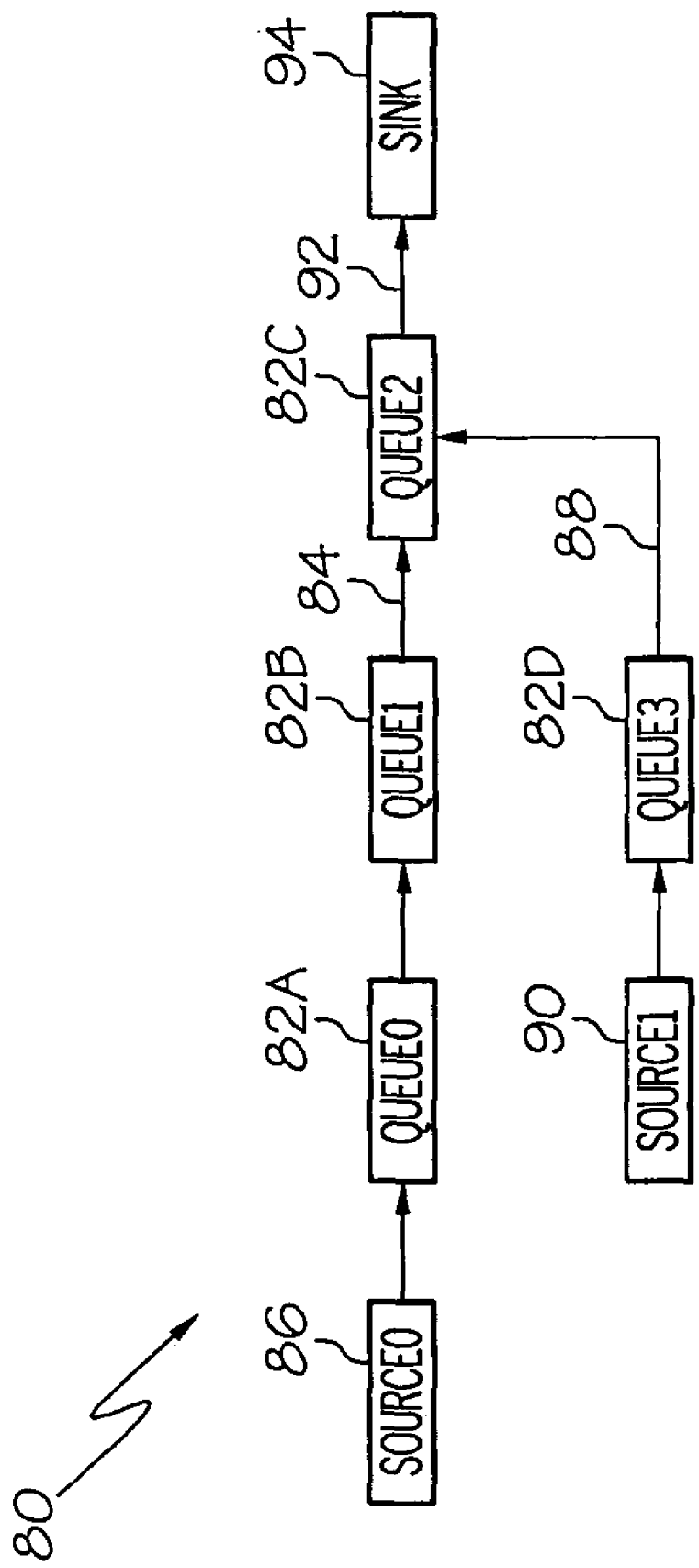
FIG. 6 shows an illustrative example involving multiple data transmissions to a single computer according to the present invention.

Referring now to FIG. 6, an illustrative example 80 is depicted whereby multiple data transmissions are received by a common queue 82C. Specifically, FIG. 6 depicts data transmission 84 from source 86 and data transmission 88 from source 90 flowing into queue 82C through various intermediate queues 82A-B and 82D. FIG. 6 further depicts the combined data transmission 92 flowing from queue 82A to sink 94. In control theory, this is generally known as a plant with processes and external effects, namely, the processing rate from queue 82C to sink 94 may be suddenly and externally changed. As such, the other processing rates should be controlled. In this example, the control requirements are: never overflow a queue if offered rates are constant, then at equilibrium the flow to sink 94 should be as high as possible (e.g., the smaller of the sum of all source offered flows or the maximum allowed flow). Also, if offered rates are constant, it is desirable to rune queue occupancy at a low level to limit queue latency.

During constant source rates, queues should be maintained at low levels so that the full queue capacity is only used to absorb "bursts." Using Dt=1 and Qmax=1, the model in FIG. 6 was controlled with the above BAT algorithm. Initially, the offered rate from source 86 was set=0.100 and the offered rate from source 90 was set=0.025. All other processing rates were 0.125. In such conditions, all queues showed low occupancy. At time step 20, the transmission rate to sink 94 was instantly reduced to 0.050, causing a congestion level in queue 82C of 0.125/0.050=2.5 times its processing capacity. The present invention responded as shown in FIG. 7.

Figure 7:
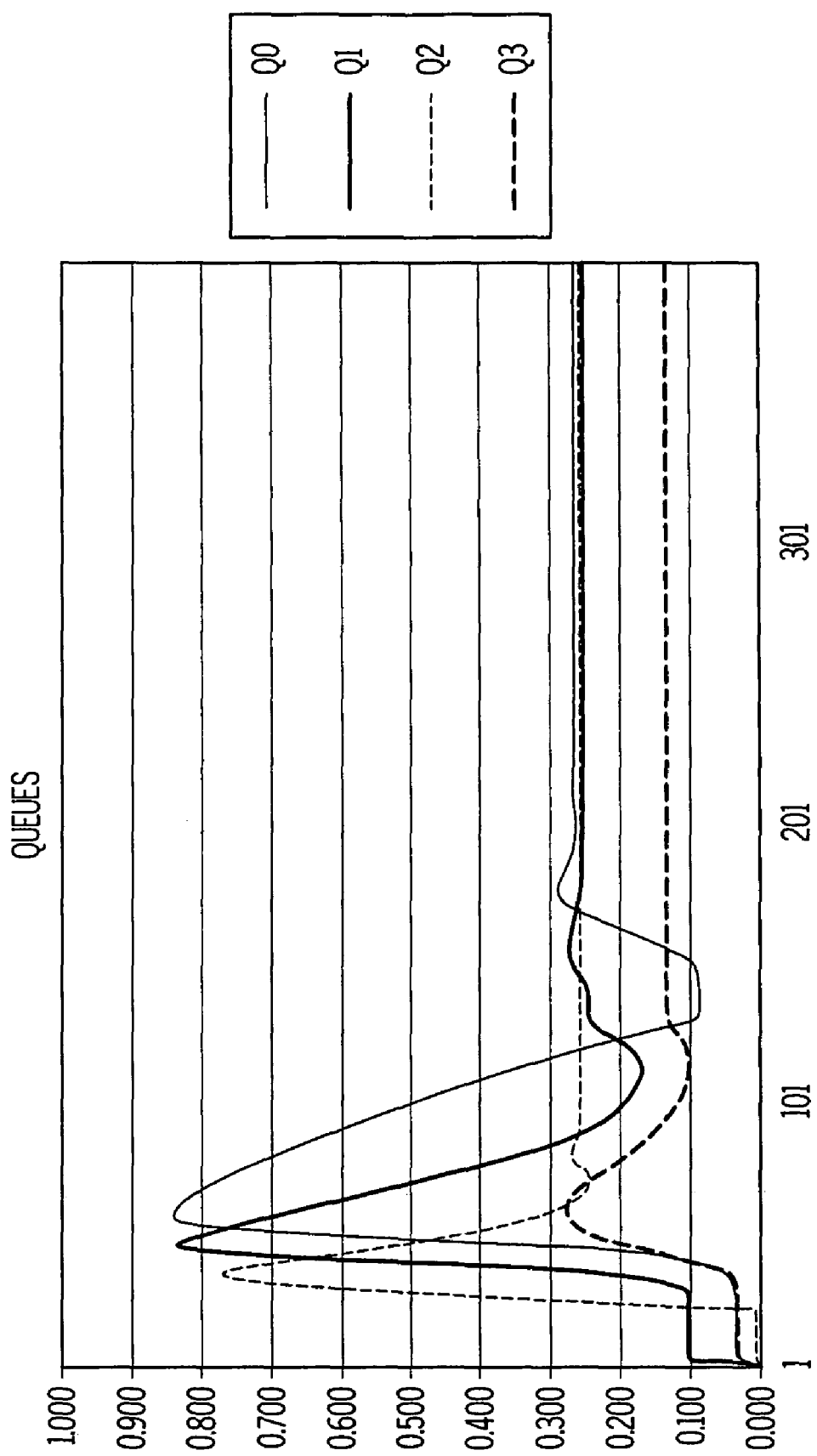
FIG. 7 shows a first graph of queue occupancy rates versus time according to the illustrative example of FIG. 6 when implementing the present invention.
Figure 8:
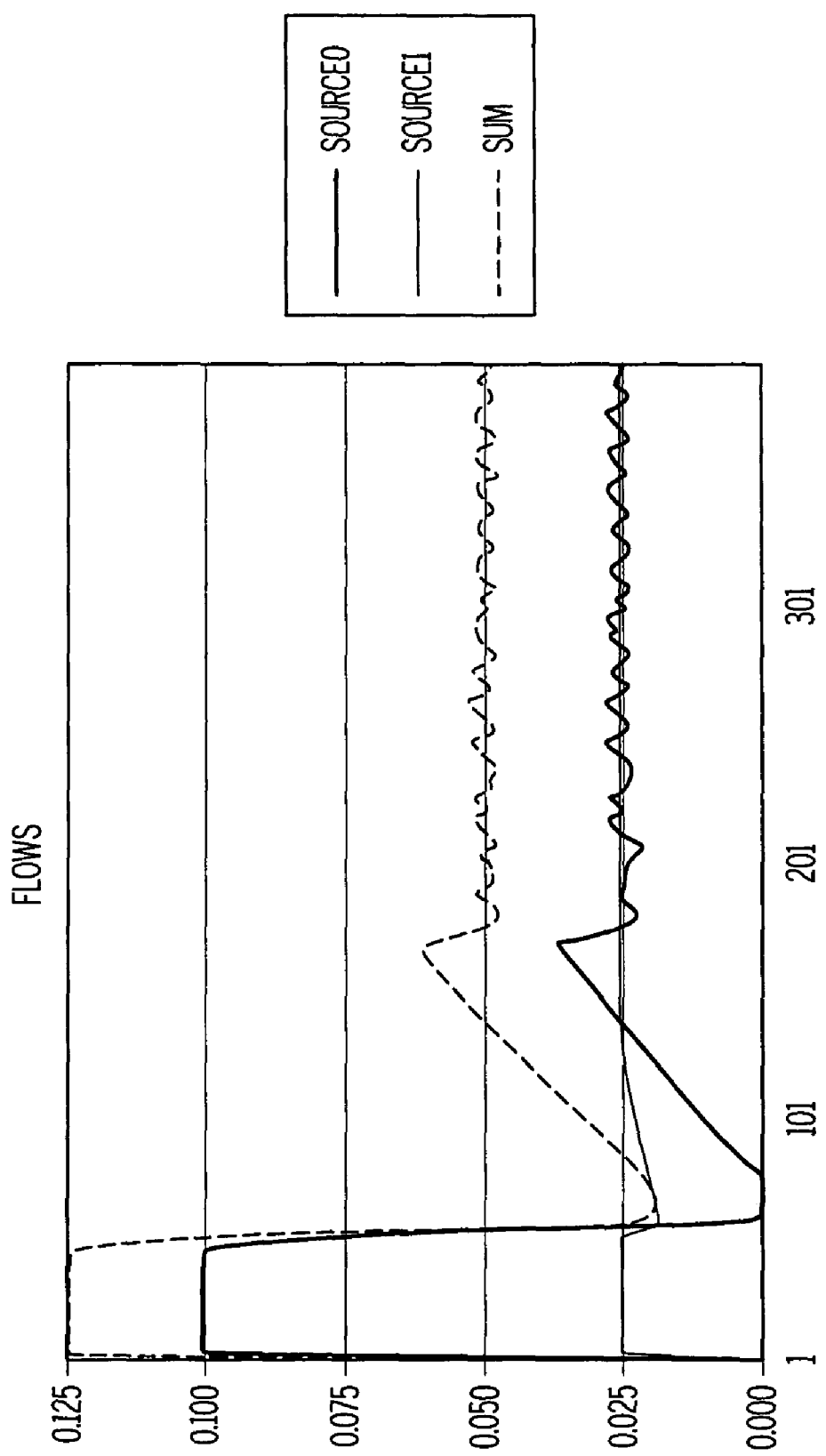
FIG. 8 shows a first graph of transmission rates versus time according to the illustrative example of FIG. 6 when implementing the present invention.

Specifically, FIG. 7 depicts a first graph of queue occupancy rates versus time for queues 82A-D. As shown, after the spike in queue occupancy caused by the reduced flow rate to sink 94 at time step 20, the present invention was able to level the queue occupancies through the transmission rate setting described above. The long-term queue occupancies were approximately 0.23 to 0.25, except at Queue 82B (Q3) which was approximately 0.13. FIG. 8 shows a first graph of transmission rates versus time according to the illustrative example of FIG. 6. As can be seen, the source flows were treated equally, and had a long term sum of approximately 0.50.

Figure 9:
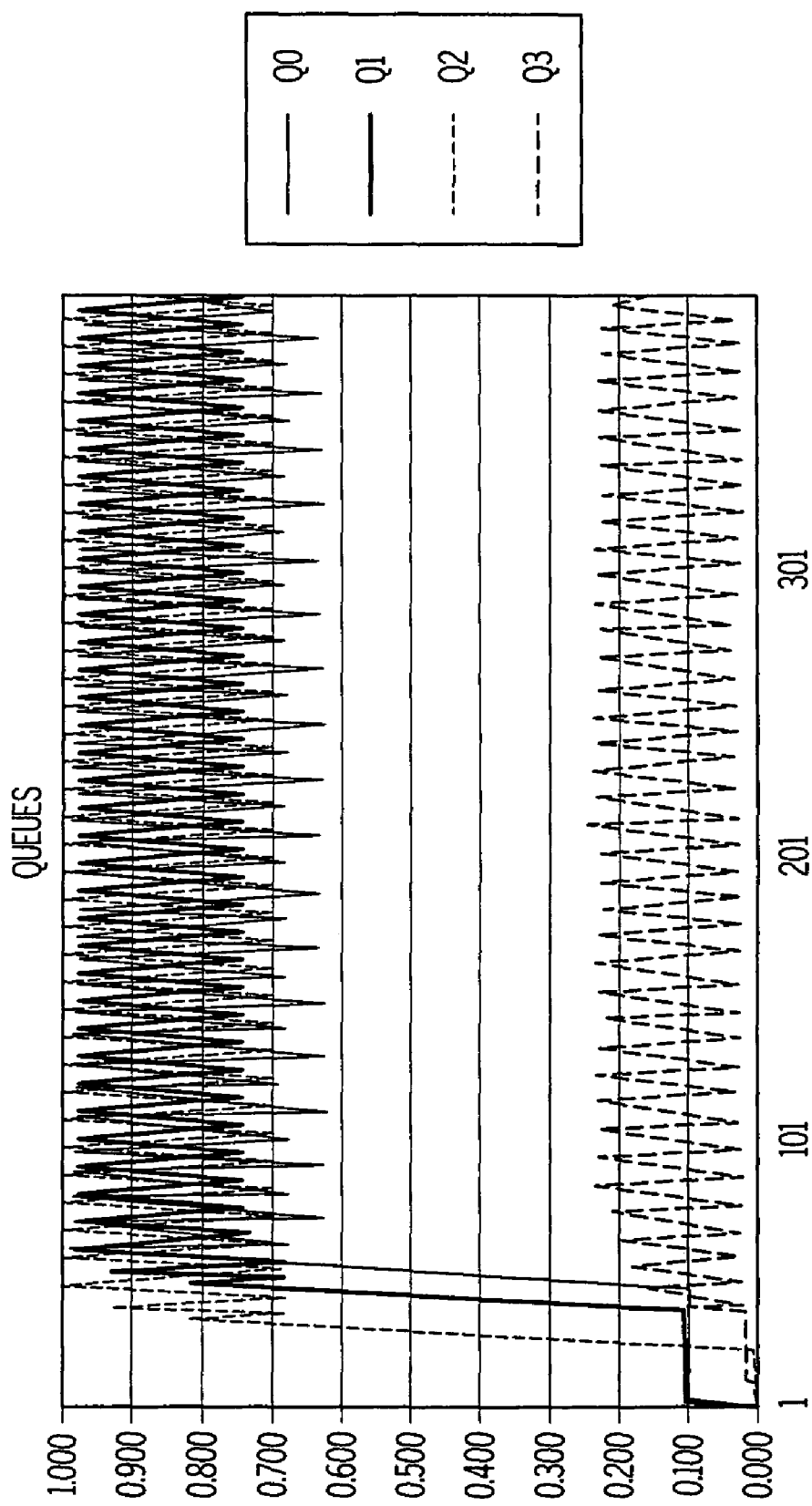
FIG. 9 shows a second graph of queue occupancy rates versus time according to the illustrative example of FIG. 6 when varying from the present invention.
Figure 10:
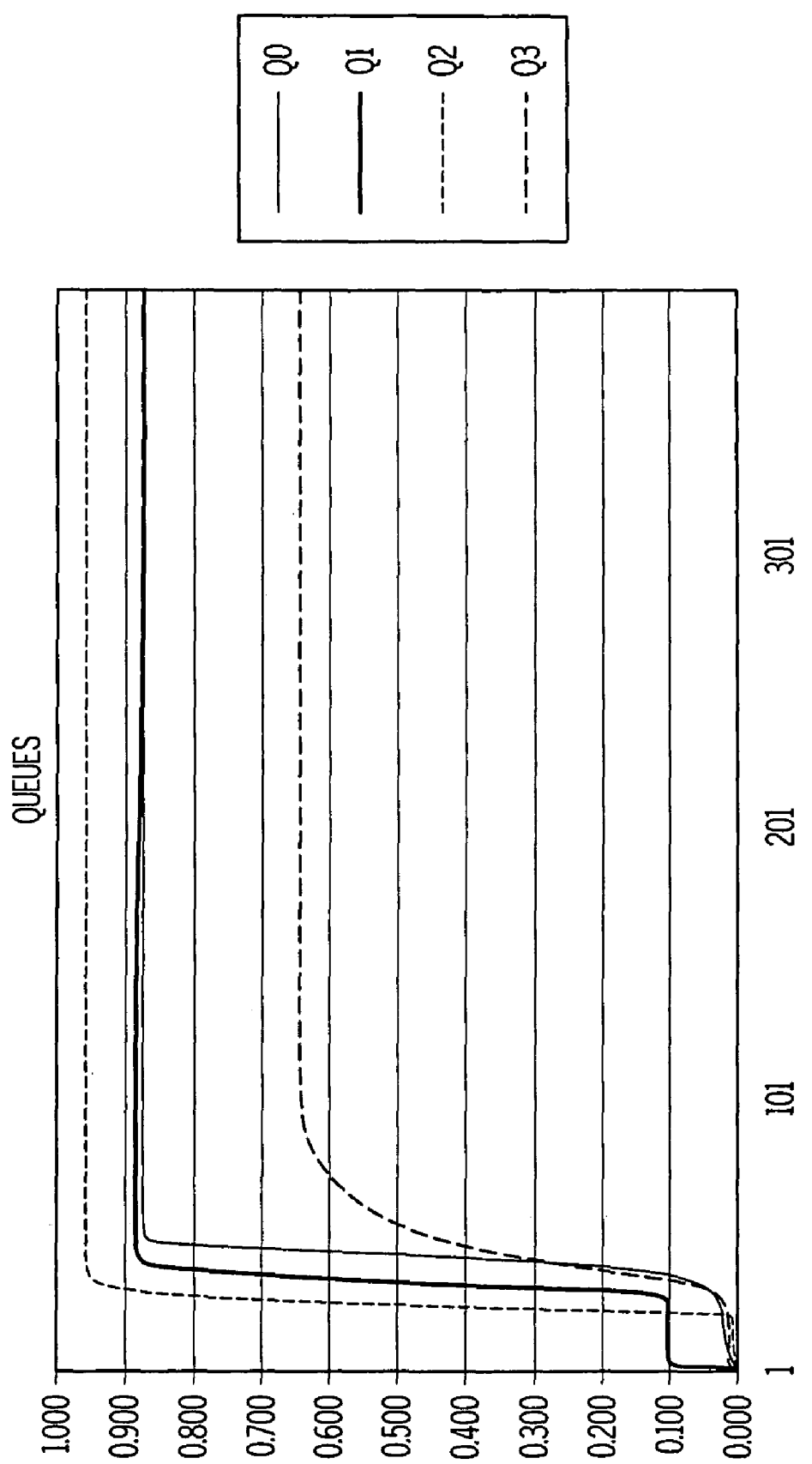
FIG. 10 shows a third graph of queue occupancy rates versus time according to the illustrative example of FIG. 6 when implemented under the present invention.

In contrast, FIG. 9 depicts a second graph of queue occupancy rates versus time for queues 82A-D when the present invention is not implemented. As can be seen, queue 82A (Q2) actually overflows, while the occupancies of queues 82A-B (Q0 and Q1) are high, reaching occupancy rates higher than 0.9. If the BAT algorithm of the present invention is instead implemented, and at time step 20 the flow rate to sink 94 is instantly reduced to zero, the system will respond as shown in FIG. 10, which depicts a third graph of queue occupancy rates versus time. As can be seen, even with the flow to sink 94 reduced to zero, the present invention still allows stability to occur.

Based on this example, the specification of Dt=⅛ or perhaps ¼ was sufficient for stability. If the transmission rate setting is not updated that fast, then no autonomous control will likely prevent a burst from overflowing the receiving queue. Consider Dt=½. Suppose at time 0 there is no flow at all or very little flow. The queue is empty or nearly empty. Also, assume in a worst case, that the rate of the draining process of the queue is zero or very low. Since there is no or very low offered flow initially, the transmission rate setting is=1, to permit all data into the queue for fast processing. Next, assume that the input suddenly becomes the maximum allowed. That is, the input flow instantaneously becomes=½. At time ½, the queue is half full. Although a control signal is created and sent instantly, it takes another time step for the system to react (e.g., completely shut down the input flow). At time ⅔, the queue is completely full. The modular unit of data in the Infiniband lossless network is 64 B, and that value is small as a fraction of typical queue capacity, say,=1/128 or smaller. However, the Maximum Transmission Unit (MTU) might be large fraction of typical queue capacity, say, 1/16. That would still be permissible but an MTU of ½ would not work, having the same effect as a large Dt.

While shown and described herein as a method and system for setting a transmission rate in a network, it is understood that the invention further provides various alternative embodiments. For example, in one embodiment, the invention provides a computer-readable medium that includes computer program code to enable a computer infrastructure to set a transmission rate in a network. To this extent, the computer-readable medium includes program code that implements each of the various process steps of the invention. It is understood that the term computer-useable (or computer-readable) medium comprises one or more of any type of physical embodiment of the program code. In particular, the computer-useable medium can comprise program code embodied on one or more portable storage articles of manufacture (e.g., a compact disc, a magnetic disk, a tape, etc.), on one or more data storage portions of a computing device, such as memory 32 (FIG. 2) and/or storage system 40 (FIG. 2) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process steps of the invention on a subscription, advertising, and/or fee basis. That is, a service provider, such as a Solution Integrator, could offer to set a transmission rate in a network. In this case, the service provider can create, maintain, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a method for setting a transmission rate in a network. In this case, a computer infrastructure can be provided and one or more systems for performing the process steps of the invention can be obtained (e.g., created, purchased, used, modified, etc.) and deployed to the computer infrastructure. To this extent, the deployment of a system can comprise one or more of (1) installing program code on a computing device, such as sending computer 10A (FIGS. 1 and 2), from a computer-useable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for setting a transmission rate in a network, comprising the steps of:
   providing a ratio of a current occupancy to a maximum occupancy of a queue used for a data transmission between a first computer and a second computer in the network; and
   setting the transmission rate for the data transmission at a predetermined time interval based on a comparison of the ratio to at least one threshold; and
   wherein the setting step comprises setting the transmission rate to a third value if the ratio is equal to or greater than a first threshold and equal to or less than a second threshold, and the current occupancy of the queue is equal to or greater than a previous occupancy of the queue.

2. A system for setting a transmission rate in a lossless network, comprising:
   a system for providing a ratio of a current occupancy to a maximum occupancy of a queue used for a data transmission between a first computer and a second computer in the lossless network; and
   a system for setting the transmission rate for the data transmission at a predetermined time interval based on a comparison of the ratio to at least one threshold, and
   wherein the system for setting the transmission rate:
   sets the transmission rate to a first value if the ratio is less than a first threshold;
   sets the transmission rate to a second value if the ratio is greater than a second threshold;
   sets the transmission rate to the first value if the ratio is equal to or greater than the first threshold and equal to or less than the second threshold, and a previous occupancy of the queue is greater than the current occupancy of the queue; and
   sets the transmission rate to a third value if the ratio is equal to or greater than the first threshold and equal to or less than the second threshold, and the current occupancy of the queue is equal to or greater than the previous occupancy of the queue.

3. A computer program product comprising a computer-readable tangible storage device storing a computer readable program for setting a transmission rate in a lossless network, wherein the computer readable program when executed by one or more computer processors:
   provides a ratio of a current occupancy to a maximum occupancy of a queue used for a data transmission between a first computer and a second computer in the lossless network;
   sets the transmission rate for the data transmission at a predetermined time interval based on the ratio and at least one threshold;
   sets the transmission rate to a first value if the ratio is less than a first threshold;
   sets the transmission rate to a second value if the ratio is greater than a second threshold;
   sets the transmission rate to the first value if the ratio is equal to or greater than the first threshold and equal to or less than the second threshold, and a previous occupancy of the queue is greater than the current occupancy of the queue; and
   sets the transmission rate to a third value if the ratio is equal to or greater than the first threshold and equal to or less than the second threshold, and the current occupancy of the queue is equal to or greater than the previous occupancy of the queue.

* * * * *